US010222913B2

(12) United States Patent
Roziere et al.

(10) Patent No.: US 10,222,913 B2
(45) Date of Patent: Mar. 5, 2019

(54) DEVICE FOR CONTACTLESS INTERACTION WITH AN ELECTRONIC AND/OR COMPUTER APPARATUS, AND APPARATUS EQUIPPED WITH SUCH A DEVICE

(71) Applicant: QUICKSTEP TECHNOLOGIES LLC, Wilmington, DE (US)

(72) Inventors: Didier Roziere, Nimes (FR); Christophe Blondin, Nimes (FR)

(73) Assignee: QUICKSTEP TECHNOLOGIES LLC, Wilmington, DE (US)

( * ) Notice: Subject to any disclaimer, the term of this patent is extended or adjusted under 35 U.S.C. 154(b) by 299 days.

(21) Appl. No.: 14/781,727

(22) PCT Filed: Mar. 28, 2014

(86) PCT No.: PCT/EP2014/056257
§ 371 (c)(1),
(2) Date: Oct. 1, 2015

(87) PCT Pub. No.: WO2014/161775
PCT Pub. Date: Oct. 9, 2014

(65) Prior Publication Data
US 2016/0041650 A1    Feb. 11, 2016

(30) Foreign Application Priority Data

Apr. 2, 2013   (FR) ..................... 13 52970

(51) Int. Cl.
*G06F 1/16*    (2006.01)
*H04M 1/02*    (2006.01)
(Continued)

(52) U.S. Cl.
CPC ............ *G06F 3/044* (2013.01); *G06F 1/1643* (2013.01); *G06F 3/0418* (2013.01);
(Continued)

(58) Field of Classification Search
CPC ........ G06F 3/0321; G06F 3/017; G06F 3/013; G06F 3/03545; G06F 3/011;
(Continued)

(56) References Cited

U.S. PATENT DOCUMENTS 5,483,261 A   1/1996  Yasutake
5,488,204 A   1/1996  Mead et al.
(Continued)

FOREIGN PATENT DOCUMENTS

EP    2 267 791 A2   10/2010
JP    2000-163031 A   6/2000
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Nalini Mummalaneni
(74) *Attorney, Agent, or Firm* — Morrison & Foerster LLP

(57) ABSTRACT

A device is provided for interacting without contact, via at least one command object, with a user appliance, including at least one first and one second part which, in use, form between them a non-zero angle, the device including:
at least one first mechanism of detection by capacitive technology, and without contact, of the at least one command object with respect to a first control surface defined with respect to the first part of the user appliance, the first detection mechanism including several measurement electrodes; at least one, of the measurement electrodes being guarded, by a guard mechanism, at a guard potential, different from a ground potential, of the at least one command object, and substantially identical to the potential of the measurement electrode; and
(Continued)

at least one second guard mechanism, for guarding the second part of the user appliance at least partially at the guard potential.

19 Claims, 3 Drawing Sheets

(51) Int. Cl.
*G06F 3/044* (2006.01)
*G06F 3/041* (2006.01)

(52) U.S. Cl.
CPC .............. *G06F 2203/04101* (2013.01); *G06F 2203/04106* (2013.01); *G06F 2203/04107* (2013.01); *H04M 1/0216* (2013.01); *H04M 2250/22* (2013.01)

(58) Field of Classification Search
CPC ...... G06F 3/04883; G06F 3/005; G06F 3/012; G06F 3/044; G06F 3/0416; G06F 3/041; G06F 3/0488; G06F 3/0425; G06F 1/1673; G06F 1/1637; G06F 1/1656; G02B 27/0093; G02B 27/0138; G02B 27/0176; G02B 2027/0118; G02B 2027/0187
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,570,064 B2 | 8/2009 | Roziere | |
| 7,663,607 B2 | 2/2010 | Hotelling et al. | |
| 8,149,002 B2 | 4/2012 | Ossart et al. | |
| 8,159,213 B2 | 4/2012 | Roziere | |
| 8,479,122 B2 | 7/2013 | Hotelling et al. | |
| 8,770,033 B2 | 7/2014 | Roziere | |
| 8,917,256 B2 | 12/2014 | Roziere | |
| 9,035,903 B2 | 5/2015 | Binstead | |
| 9,151,791 B2* | 10/2015 | Roziere | G06F 3/044 |
| 2006/0097733 A1 | 5/2006 | Roziere | |
| 2006/0197753 A1 | 9/2006 | Hotelling | |
| 2008/0284261 A1 | 11/2008 | Andrieux et al. | |
| 2009/0139778 A1* | 6/2009 | Butler | G06F 1/1626 178/18.03 |
| 2010/0052700 A1 | 3/2010 | Yano et al. | |
| 2010/0321275 A1* | 12/2010 | Hinckley | G06F 1/1618 345/1.3 |
| 2011/0007021 A1 | 1/2011 | Bernstein et al. | |
| 2011/0169770 A1 | 7/2011 | Mishina et al. | |
| 2011/0169783 A1 | 7/2011 | Wang et al. | |
| 2012/0044662 A1 | 2/2012 | Kim et al. | |
| 2012/0187965 A1 | 7/2012 | Roziere | |
| 2012/0188200 A1 | 7/2012 | Roziere | |
| 2013/0135247 A1 | 5/2013 | Na et al. | |
| 2013/0307776 A1 | 11/2013 | Roziere | |
| 2014/0132335 A1 | 5/2014 | Rauhala et al. | |
| 2015/0035792 A1 | 2/2015 | Roziere et al. | |
| 2015/0193012 A1* | 7/2015 | Phan | G06F 3/011 345/156 |
| 2015/0303561 A1* | 10/2015 | Yang | H01Q 1/2266 343/842 |

FOREIGN PATENT DOCUMENTS

| | | | |
|---|---|---|---|
| JP | 2002-342033 A | | 11/2002 |
| JP | 2011-146915 A | | 7/2011 |
| JP | 2012-533122 A | | 12/2012 |
| WO | WO/2011/015795 | * | 2/2011 |
| WO | WO-2012/106215 A2 | | 8/2012 |
| WO | WO-2012/177237 A1 | | 12/2012 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DEVICE FOR CONTACTLESS INTERACTION WITH AN ELECTRONIC AND/OR COMPUTER APPARATUS, AND APPARATUS EQUIPPED WITH SUCH A DEVICE

BACKGROUND

The present invention relates to a device for interacting, without contact, with an electronic and/or computerized appliance comprising at least two parts forming between them a non-zero angle. It also relates to an electronic/computerized appliance equipped with such a device.

The field of the invention is more particularly, but non-limitatively, that of contactless human-machine interfaces implementing a capacitive detection technology.

Increasing numbers of portable appliances such as portable computers are equipped with a touch screen and provide human-machine interface (HMI) functions close to those of the portable appliances such as smart phones and touch-screen tablets. These appliances use as their interface touch pads that are transparent on the screens and opaque with respect to the keypads.

Most of these pads use capacitive technology. This technology, which is very widespread today, makes it possible to detect one or more objects (fingers, stylus, etc) in contact on the touch surface.

The patent FR 2 893 711 filed by the applicant is known, which describes a capacitive solution making it possible to detect the two-dimensional position of a finger over a control surface at a distance of several cm and of a hand at more than 10 cm.

The patent application filed by the applicant, published under number FR 2 971 066 A1 is also known, which describes an interface making it possible to determine, in addition to the two-dimensional position of an object in the plane formed by a control surface, a vertical distance between the control surface and the object and to initiate specific functions depending on the value of this vertical distance, such as a navigation in depth.

The range of detection and the operation of all these detection interfaces nevertheless depend on the electrostatic environment of the pad. The proximity detection range is for example degraded when the appliance is not flat and comprises, in addition to a first part equipped with the detection interface, a second part forming a non-zero angle with the first part. This second part creates interference in the electrostatic field generated by the electrodes of the detection interface, and degrades the performance and operation of the detection interface, in particular at the intersection of the second part with the first part.

The solutions of the state of the art are therefore not suitable for appliances comprising at least two parts forming between them a non-zero angle.

A purpose of the present invention is to propose a device for interacting without contact with an appliance comprising at least two parts forming between them a non-zero angle.

Another purpose of the present invention is to propose a device for interacting without contact with an appliance comprising at least two parts forming between them a non-zero angle and proposing a three-dimensional contactless interaction at a greater distance compared with the existing solutions.

Finally another purpose of the present invention is to propose a device for interacting without contact with an appliance comprising at least two parts forming between them a non-zero angle allowing a three-dimensional contactless interaction that is more precise than the existing solutions.

SUMMARY

At least one of these objectives is achieved by a device for interacting without contact, via at least one command object, with an electronic and/or computerized appliance, named a user appliance, comprising at least one first and one second part which, in use, form between them a non-zero angle, said device comprising:

at least one first means for detection by capacitive technology, and without contact, of said at least one command object with respect to a first control surface defined with respect to said first part of said user appliance, said first detection means comprising several capacitive electrodes, named measurement electrodes; at least one, preferably each, of said measurement electrodes being guarded, by a first means, named guard means, at an alternating potential, named guard potential, different from a potential, named ground potential, of said at least one command object, and substantially identical to the potential of said measurement electrode.

at least one second means, named guard means, for maintaining said second part of said user appliance at least partially at said guard potential.

The device according to the invention implements a guard, at a guard potential, of the measurement electrodes of the first detection means, which makes it possible on the one hand to eliminate the parasitic coupling capacitances which distort the capacitive measurement used for the detection of the command object, and on the other hand to avoid carrying out detection in all directions around the capacitive electrode, and therefore to control the direction(s) in which the detection of the command object is carried out. For example, the fact of guarding a capacitive electrode by a guard electrode placed on the rear face and/or lateral faces of the electrode makes it possible to avoid or to limit the detection of a command object at the rear and/or on the sides of the control surface.

In addition, provision is made in the device according to the invention to set the second part of the user appliance at a guard potential, identical or substantially identical to the guard potential of the measurement electrodes. Thus, the device according to the invention makes it possible to avoid the second part of the user appliance causing interference in the electrostatic field created by the measurement electrodes of the first detection means, and degrading the detection and the detection range of the measurement electrodes of the first detection means. Thus, the detection produced by the first detection means is not degraded.

As a result, the device according to the invention makes it possible to carry out a contactless interaction that is more precise and has a greater range with an appliance comprising at least two parts forming between them a non-zero angle, and more generally a contactless interaction that is more suitable for such an appliance compared to the existing solutions.

In the present application by "detection or item of detection data" is meant detection of one or of any combination of the following parameters relating to the at least one command object: one or more positions in two or three dimensions, a speed, acceleration, shape, dimension, etc.

Advantageously, the device according to the invention can comprise:

at least one second means of detection of said at least one command object with respect to a second control surface forming a non-zero angle with respect to said first control surface and defined with respect to the second part of said user appliance; and at least one calculation means for determining, as a function of the detections carried out by the first and second detection means, and optionally of an angle formed by the first and second control surfaces, an item of detection data, for example relating to a position/speed/acceleration/shape/dimension, of said at least one command object.

Thus, the device according to the invention makes it possible to form a contactless control volume between the first and second parts of the appliance, and in particular between the first and second control surfaces. The command object inserted into this interaction volume is detected with reference to each control surface, and an item of data relating to the position/speed/acceleration/shape/dimension of the command object in the control volume is obtained, by the calculation means, by intersection of the detection data of the command object with respect to each of the control surfaces, and optionally as a function of the angle between the two control surfaces.

Moreover, detection produced with respect to two control surfaces which are not parallel to each other makes it possible to detect a second command object which may be hidden by a first command object with respect to one of the control surfaces. In fact, if a second command object is not seen by one of the control surfaces because it is behind a first command object, then this second object is necessarily seen by the other control surface. For example a hand of a user can be hidden behind his other hand, the device according to the invention allowing the detection of both of the user's hands.

According to a preferred embodiment of the device according to the invention, the second detection means can comprise several capacitive electrodes, named measurement electrodes; at least one, preferably each, of said measurement electrodes being maintained at the guard potential by the second guard means.

The advantages described above with reference with the first capacitive detection means are applicable mutatis mutandis to the second detection means.

The guard potential used for the second detection means can be the same or substantially the same as the guard potential used for the first detection means.

The principle used in the present application for guarding a guard potential, a measurement electrode or more generally a part of an appliance, can preferably be that described in patent FR 2 893 711 filed by the applicant, to which a person skilled in the art may refer for further details.

Alternatively or in addition, the second detection means can comprise at least one or any combination of the following means:
- an array of optical pixels,
- an array of infrared diodes,
- an array of optical light sensors,
- at least one optical emitter associated with at least one optical receiver,
- at least one ultrasound emitter associated with at least one ultrasound receiver operating by triangulation or trilateration, and
- at least one time-of-flight camera.

The first detection means can also comprise one or any combination of these aforementioned means, as well as the capacitive technology.

Advantageously, each of the first and second detection means can moreover be arranged in order to carry out detection of at least one, in particular several, command object(s) by contact of the at least one command object with the control surface associated with each detection means.

In the case in which at least one of the parts of the user appliance can be repositioned by rotation with respect to the other part such that at least one of the control surfaces can be repositioned with respect to the other control surface, the device according to the invention can also comprise a means of measuring the angle formed by said control surfaces, i.e. between the two parts of the user appliance.

For example, the angle formed by the control surfaces, i.e. by the parts of the user appliance, can be variable and changed by the user, in particular depending on the applications or conditions of use of the user appliance.

According to a non-limitative embodiment, the first detection means can comprise one or more measurement electrodes oriented or facing towards the second part of the appliance and used for measuring the angle between the first and the second part of the appliance. These measurement electrodes can be arranged at, or close to, the intersection of the planes formed by the first part and the second part of the appliance.

Advantageously, the first or second detection means respectively can be arranged in order to detect/measure:
- a two-dimensional position of the command object (116) in the first control surface (118;122), or the second control surface (122;118) respectively, and/or
- a distance, named vertical distance, between the command object (116) and the first control surface (118;122) or the second control surface (122;118) respectively.

Such detection of vertical distance with respect to at least one of the control surfaces, preferentially with respect to each of the control surfaces, makes it possible to have redundant detection data and thus to correct/verify the detection of the command object carried out by at least one of the detection means. Such an item of vertical distance data is particularly useful when the command object is at a distance from one of the control surfaces or from both control surfaces.

The first or second detection means respectively can be arranged in order to carry out detection of the two-dimensional position by contact, or preferentially without contact, of the object with the first or second control surface respectively.

The first detection means, or second detection means, respectively can advantageously be incorporated in/on the first control surface or in/on the second control surface, respectively. The first surface or the second surface respectively can be a surface or a face of the first part of the user appliance or of the second part of the user appliance, respectively. In this configuration, the device according to the invention has a more compact architecture and is incorporated at least partially into the user appliance.

According to a non-limitative and particularly preferred version of the device according to the invention:
- the first detection means comprises a first array of capacitive electrodes arranged in/on/behind the first control surface, preferentially formed at least partially by a panel/surface/face of the first part of the user appliance arranged on the side of the second part of said user appliance, and
- the second detection means comprises a second array of capacitive electrodes arranged in/on/behind the second control surface, preferentially formed at least partially by a panel/surface/face of the second part of the user appliance arranged on the side of the first part of said the user appliance;

at least one, preferably each, of the electrodes of each array of electrodes being guarded at an alternating potential, named guard potential, different from a potential, named ground potential, of the command object, and substantially identical to the potential of said electrode.

According to an advantageous version, the first control surface and/or the second control surface can be a touch surface.

According to another aspect of the invention an electronic and/or computerized appliance is proposed comprising at least one first and one second part which, in use, form between them a non-zero angle, equipped with a device according to the invention.

The angle between the first and second parts of the user appliance can be comprised between 1 and 179°, more particularly comprised between 70° and 130°.

Such an appliance can be a portable computer, a smart phone, a games console, a tablet equipped with a keyboard, whether a touch pad or not, or more generally any electronic/computerized appliance comprising two parts, whether or not mutually mobile, which in use form between them a non-zero angle.

Each part may or may not contain an input means, whether touch input means or not, and/or a display screen, whether a touch screen or not.

More particularly, at least one of the first and second parts of the user appliance can comprise a display screen, which may be a touch screen or not, the first or second detection means respectively can be incorporated in/on/around/on the periphery/behind said display screen such that the first control surface or the second control surface respectively is formed by at least a part of said display screen and/or by a plane parallel to said display screen.

Such a display screen can for example be a folding and unfolding display screen of a portable personal computer, a telephone, a smart phone, a PDA or an electronic games console such as the Nintendo® DS™, the user appliance then being one of these appliances.

Moreover, at least one of the first and second parts of the user appliance can comprise a surface, named an input surface, containing at least one data input means, such as a keyboard; the first or second detection means respectively can be incorporated in/on/around/on the periphery of/behind said input surface such that the first control surface or the second control surface respectively is formed by at least a part of said input surface and/or by a plane parallel to said input surface.

Such an input surface can be for example a folding and unfolding keyboard of a portable personal computer, telephone, smart phone, PDA, or electronic games console.

Such an input surface can comprise in addition or alternatively a touch screen for inputting.

Such an input surface can be formed by a keyboard only, which forms one of the parts of the user appliance, and is detached manually from the other part of the appliance.

In the case where a control surface is formed, at least partially in/on/around/on the periphery of/behind an input surface, while the control surface can be formed by only a part of the input surface, said input surface also being capable of containing at least one zone provided for resting thereon at least one hand of a user during inputting, or an object used during inputting, said zone being connected to ground potential.

Thus, the appliance according to the invention makes it possible to avoid the user's hands, or an input object held by a user wishing to carry out an input on the input means, being detected by the detection means incorporated in/on/around/on the periphery of/behind the input surface, and thus distorting the detection of the command object. The appliance makes it possible to avoid the hands or the input object being detected as a command object when the user merely wishes to carry out an input on the input means.

Advantageously, this zone can be located on a part of the input surface furthest away from the other part of the appliance, which can be for example a display screen such as described above.

More particularly, the zone maintained at ground potential can be located on a part of the input surface furthest from an axis of intersection of the planes formed by the two parts of the user appliance. Such an axis can also be an axis of rotation of at least one of the parts of the command appliance.

The zone maintained at ground potential can be located on a part of the input surface proximal to the user when he uses the appliance.

According to a non-limitative embodiment, the appliance according to the invention can comprise a display screen, whether a touch-screen or not, and a surface, named an input surface, comprising an input means, such as a keyboard. In this case:
  the first detection means can be arranged on/in the display screen, the first control surface being constituted by at least a part of the display screen, and
  the second detection means can comprise an array of capacitive electrodes arranged on/in the input surface, the second control surface being constituted by only a part of said input surface.

Advantageously, the display screen can in particular be mobile in rotation about an axis parallel to the input surface The screen can be fixed to the input surface or not. In other words, the screen may or may not be physically attached to the input surface, in particular to the input means, for example to the keyboard.

The input means, for example a keyboard, can be detachably fixed to the screen.

The screen can for example be constituted by a touch tablet and the keyboard by a mobile keyboard.

The input surface can be constituted by the input means only, i.e. the keyboard can constitute the input surface which comprises the keyboard alone.

More generally, and regardless of the configuration of the first and second parts of the appliance according to the invention, the first part and the second part can be detachable with respect to each other in such a way that they can be attached and detached manually at will, for example by the user, without using any tool.

In addition, the first part and the second part can comprise wired or wireless means for the exchange of signals, in particular for synchronization with respect to the alternating guard potential, or for communicating signals measured by the first and second measurement means.

BRIEF DESCRIPTION OF THE DRAWINGS

Other advantages and characteristics will become apparent on examination of the detailed description of examples which are in no way limitative, and from the attached drawings in which.

DETAILED DESCRIPTION

It is well understood that the embodiments that will be described hereinafter are in no way limitative. In particular, variants of the invention can be envisaged comprising only a selection of characteristics described hereinafter, in isolation from the other described characteristics, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular all the variants and all the embodiments described can be combined together if there is no objection to this combination from a technical point of view.

In the figures, the elements common to several figures retain the same reference.

Different examples of an electronic/computerized appliance according to the invention implementing different embodiments of a device according to the invention will now be described. The appliance according to the invention described hereinafter can be a computer, a telephone or smart phone, a games console, a PDA, a touch tablet, etc., comprising two parts which in use form between them a non-zero angle.

Figure 1:
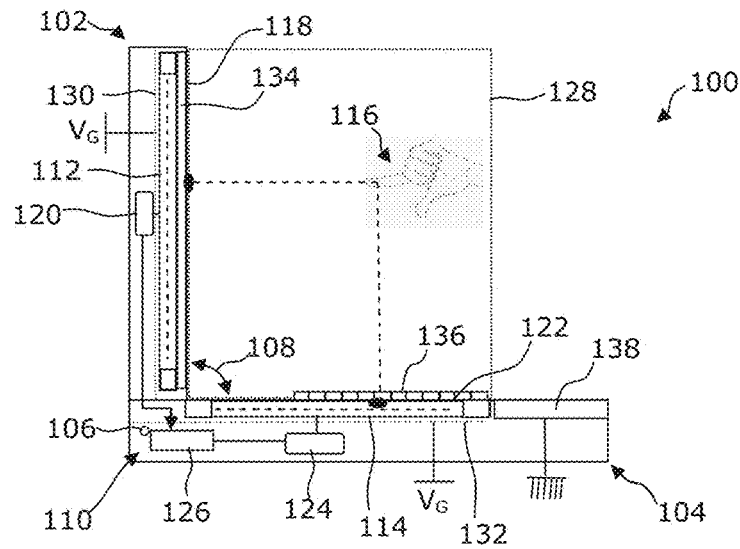
FIG. 1 is a diagrammatic side view of a first example of an appliance according to the invention implementing a device according to the invention.

FIG. 1 is a diagrammatic side view of an example of an appliance according to the invention implementing a device according to the invention.

The appliance 100 shown in FIG. 1 comprises a first part 102 and a second part 104, mutually mobile about an axis of rotation 106. The two parts 102 and 104 of the appliance can be folded or unfolded about the axis 106 in order to form between them a non-zero angle represented by the double arrow 108.

In the example shown in FIG. 1, the appliance 100 comprises a device 110 allowing to a user to interact, with and without contact, with the appliance 100. This device forms an, or the, human-machine interface of the appliance 100 and utilizes capacitive sensors only.

The device 110 comprises a first array 112 of n capacitive sensors arranged in the first part 102 of the appliance 100 and a second array 114 of m capacitive sensors arranged in the second part 104 of the appliance 100.

The first array 112 of capacitive sensors makes it possible to determine the position/speed/acceleration/shape/dimension of at least one command object 116 with respect to a control surface 118 produced by at least a part of the inner face of the first part 102 of the appliance 100, i.e. the face which is on the side of the second part 104 of the appliance 100. The capacitive sensors of this array 112 are linked to a calculation module 120, which depending on the measurement signals received from the sensors, determines the position/speed/acceleration/shape/dimension of the command object 116 with respect to the control surface 118, this command object being in contact with the control surface 118 or not.

The second array 114 of capacitive sensors makes it possible to determine the position/speed/acceleration/shape/dimension of at least one command object 116 with respect to a control surface 122 produced by only a part of the inner face of the second part 104 of the appliance 100, i.e. the face which is on the side of the first part 102 of the appliance 100. The capacitive sensors of this array 114 are linked to a calculation module 124, which depending on the measurement signals received from the sensors, determines the position/speed/acceleration/shape/dimension of the command object 116 with respect to the control surface 122, this command object being in contact with the control surface 122 or not.

The position/speed/acceleration/shape/dimension of the command object 116 determined by each array 112 and 114 of capacitive sensors correspond to a position/speed/acceleration/shape/dimension with respect to the control surface, respectively 118 and 122, associated with each array, whether or not the command object is in contact with each of the control surfaces 118 and 122. The detection of the command object 116 carried out by each array 112 and 114 can also comprise for at least one, advantageously each, control assembly, a height of the command object 116 in a vertical direction with respect to the control surface, respectively 118 and 122, associated with the array of sensors.

The device 110 also comprises a detection module 126, linked to each of the calculation modules 120 and 124 of each array of sensors 112 and 114. This detection module 126 determines, depending on the detection data determined by each of the calculation modules 120 and 124 with respect to each of the detection surfaces 118 and 122, an item of three-dimensional detection data of the command object 116. In the example shown in the figure, the detection module 126 is arranged in the second part 104 of the appliance 100. Alternatively, this module 126 can be arranged in the first part 102 of the appliance 100.

Thus, the interaction device 110 makes it possible to create a volume 128 for contactless control (or interaction with) the appliance 100, this contactless control volume being formed and determined by the control surfaces 118 and 122, and more particularly by the detection means 112 and 114.

Each of the arrays 112 and 114 of capacitive sensors comprises a plurality of electrodes, named measurement electrodes, and one or more associated measurement electronics (not shown). Each measurement electrode of each array 112 and 114, and the measurement electronics associated therewith, are guarded by a guard means, 130 and 132 respectively, maintained at a potential $V_G$, named guard potential, substantially equal to the supply potential of the measurement electrodes, and which can comprise:

at least one other electrode, which can be:
  one or more guard electrodes dedicated to this guard function as described in the document, or
  one or more measurement electrodes adjacent to the measurement electrode; or any other conductive surface, in particular arranged behind or on the side of one or more measurement electrodes and at least a part of the associated measurement electronics;
according to the principle described in the document FR 2 971 066 A1.

In the example shown in FIG. 1, the first part 102 of the appliance 100 comprises a display screen 134 arranged on the side of the inner face of the part 102. The surface of this display screen 134 produces at least partially, in particular totally, the first control surface 118, which extends substantially over the entire surface of the display screen 134.

Still in the example shown in FIG. 1, the second part 104 of the appliance 100 comprises a keyboard 136 arranged on the side of the inner face of the part 104. The second control surface 122 is arranged under, or is partially formed by, this keyboard 134. More particularly, the second control surface extends substantially over the entire depth of the inner face of the part 104 from the junction between the parts 102 and 104 to the end of the keyboard 136 proximal to the user when the latter uses the appliance 100. In addition, the second control surface 122 extends substantially over the entire width of the second part 104 of the appliance. Moreover, the second part 104 contains a zone 138 which is maintained at ground potential, substantially equal to the potential of the command object 116, so that, when the user places his hands or the command object 116 over this zone, for example in order to carry out an input on the keyboard 136, his hands or the command object 116 are (is) not detected so as not to disturb the interaction with the appliance 100.

Alternatively, the first part 102 may not comprise a display screen but an input means. As an alternative, the first part 102 may comprise neither a display means nor an input means.

Alternatively, the second part 104 may not comprise an input means but a display means, in which case the appliance 100 comprises two display screens such as for example in the case of a games console with two screens, for example the Nintendo® DS™.
As an alternative, the second part 104 may comprise neither a display means nor an input means.

A person skilled in the art can combine any one of the alternatives described for the second part with any one of the alternatives described for the first part.

Moreover, the first part and the second part can be detachable or removable with respect to each other so that the user can attach or detach them at will, or even use the appliance 100 by placing the first part and the second part at a distance from each other. In this case, the communication between at least one of the measurement modules 120 and 124 and the detection module 126 can be carried out wirelessly. In addition, the coupling between the two parts 102 and 104 for synchronizing the supply voltages of the capacitive sensors and/or for synchronizing the supply voltage used for the guard means 130 and 132 can also be carried out wirelessly.

Figure 2:
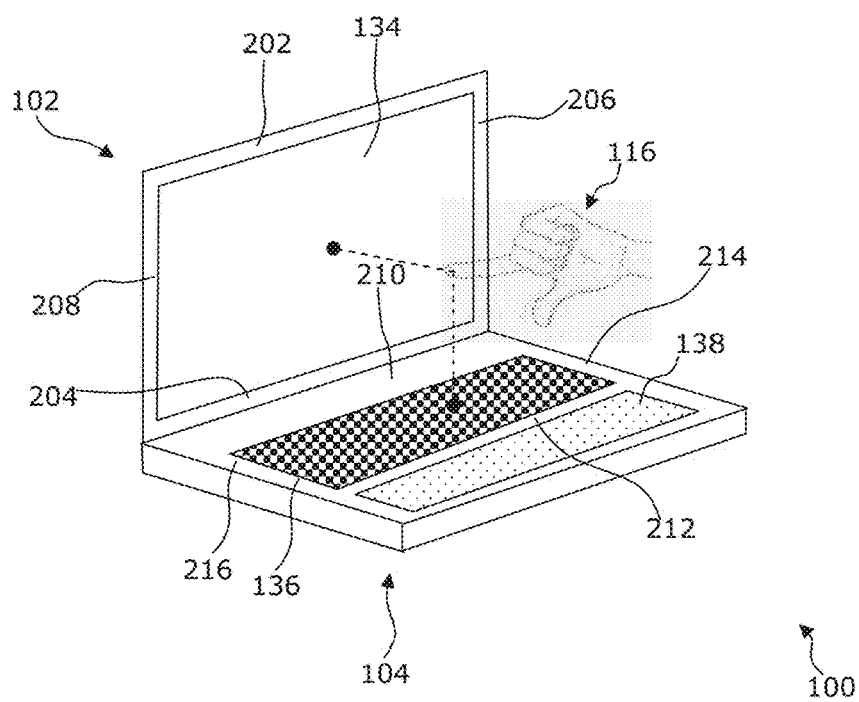
FIG. 2 is an isometric diagram of the appliance in FIG. 1.

FIG. 2 is an isometric diagrammatic view of the appliance 100 in FIG. 1.

The first array 112 of sensors associated with the first part 102 of the appliance 100 can be arranged under/on/in the entire surface of the screen 134 on the side of the inner face of the part 102 of the appliance.

Alternatively, the first array 112 of sensors can comprise a series of sensors arranged at at least one of the edges 202-208 of the first part 102 of the appliance 100, on the side of the inner face of the first part. Thus, the first array 112 can comprise one, two, three or even four series of sensors arranged, respectively at one, two, three or even four edges 202-208 of the first part 102. When the first array 112 comprises two series of sensors, these two series of sensors can be arranged at two adjacent or opposite edges of the first part. Each series of sensors can, in particular, be arranged on the periphery of the display screen 134.

The second array 114 of sensors associated with the second part 104 of the appliance 100 can be arranged under/on/in the entire input surface, between the earthed (grounded) zone 138 and the intersection of the second part 104 and the first part 102.

Alternatively, the second array 112 of sensors can comprise a series of sensors arranged on at least one of the edges 210-216 of the input means 136, on the side of the inner face of the second part 104. Thus, the second array 112 can comprise one, two, three or even four series of sensors arranged respectively at one, two, three or even four edges 210-216 of the input means 136. When the second array 112 comprises two series of sensors, these two series of sensors can be arranged at two adjacent or opposite edges of the input means. Each series of sensors can be arranged on the periphery of the input means 136.

The sensors of each array 112 or 114 can comprise electrodes carrying out autonomous detection, in "self detection" mode, or detection in collaboration with another electrode, in "mutual detection" mode.

Figure 3:
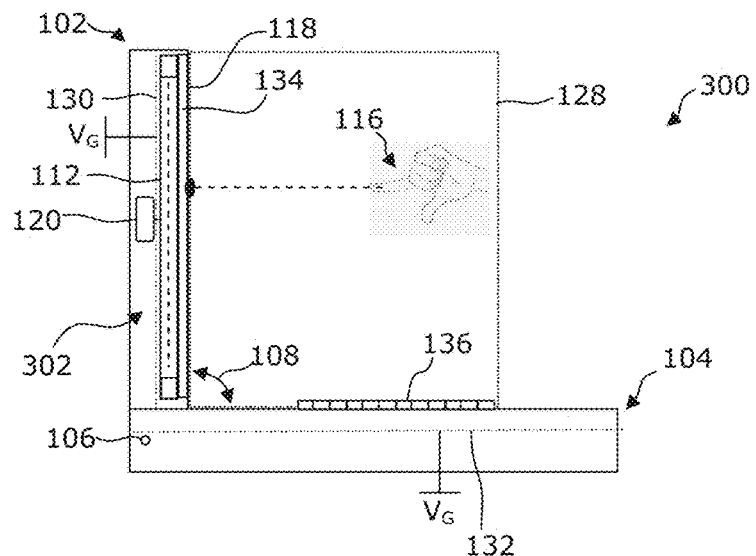
FIG. 3 is a diagrammatic side view of a second example of an appliance according to the invention implementing a device according to the invention.

FIG. 3 is a schematic diagram of a second example of an appliance according to the invention.

The appliance 300 shown in FIG. 3 corresponds to the appliance 100 in FIG. 1, without the detection means associated with the second part. Thus, the appliance 300 comprises detection device 302 which comprises all the elements of the device 110 of the appliance 100 shown in FIG. 1, associated with the first part 102 of the appliance 100.

In other words, the detection device 302 of the appliance 300 comprises the first array of sensors 112 associated with the first part 102 of the appliance 300, linked to the first detection module 120, and guarded by the first guard means 130 set at the alternating guard potential $V_G$.

The second part 104 comprises only the second guard means, also set at the guard potential, and extending over the entire surface of the second part 104 of the appliance 300.

The first array of sensors 112 can be present and arranged at the level of the first part of the appliance 300, in the same way as described, with reference to FIG. 2, for the appliance 100 and the device 110.

The device 302 of the appliance 300 in FIG. 3 does not comprise the calculation module 126 either.

In this embodiment, no detection of the command object is produced with respect to a second control surface defined with respect to the second part 104 of the appliance 300. The command object is only detected by the first detection means 112 with respect to the first detection surface 118 defined with respect to the first part 102 of the appliance 300.

The fact that the second part 104, in particular the face of the second part 104 situated on the side of the first part 102, is guarded at the guard potential $V_G$ by the second guard means 132 makes it possible to avoid the interference created by this second part 104 in the detection produced by the first detection means 112.

Figure 4:
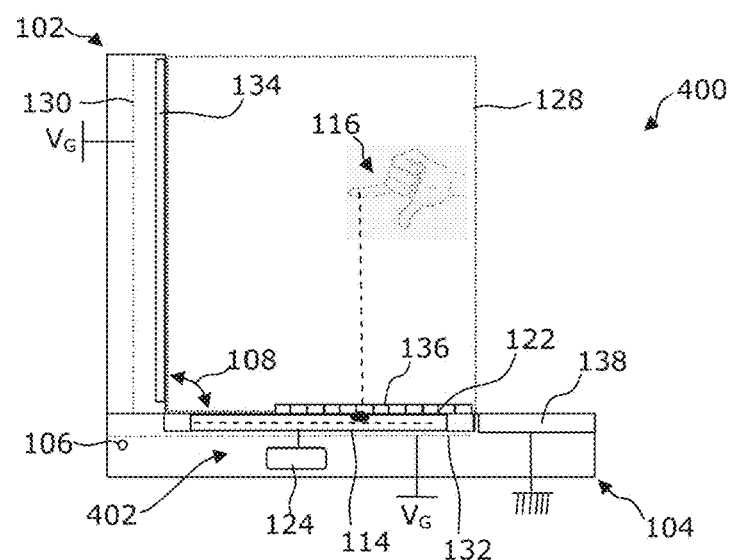
FIG. 4 is a diagrammatic side view of a third example of an appliance according to the invention implementing a device according to the invention.

FIG. 4 is a schematic diagram of a third example of an appliance according to the invention.

The appliance 400 shown in FIG. 4 corresponds to the appliance 100 in FIG. 1, without the detection means associated with the first part. Thus, the appliance 400 comprises a detection device 402 which comprises all the elements of the device 110 of the appliance 100 shown in FIG. 1, associated with the second part 102 of the appliance 100.

In other words, the detection device 402 of the appliance 400 comprises the second array of sensors 114 associated with the second part 104 of the appliance 400, linked to the second detection module 124, and guarded by the second guard means 132 set at the alternating guard potential $V_G$. The appliance 400 also comprises the earthed (grounded) zone 138.

The first part 102 comprises only the first guard means 130, also set at the guard potential, and extending over the entire surface of the first part 102 of the appliance 400.

The device 402 of the appliance 400 in FIG. 3 does not comprise the calculation module 126 either.

The second array of sensors 114 can be present and arranged at the level of the first part of the appliance 400, in the same manner as described, with reference to FIG. 2, for the appliance 100 and the device 110.

In this embodiment, no detection of the command object is produced with respect to a first control surface defined with respect to the first part 102 of the appliance 300. The command object is only detected by the second detection means 114 with respect to the second detection surface 122 defined with respect to the second part 104 of the appliance 400.

The fact that the first part 102, in particular the face of the first part 102 situated on the side of the second part 104 is set at the guard potential $V_G$ by the first guard means 130 makes it possible to avoid the interference created by this first part 102 in the detection produced by the second detection means 124.

Figure 5:
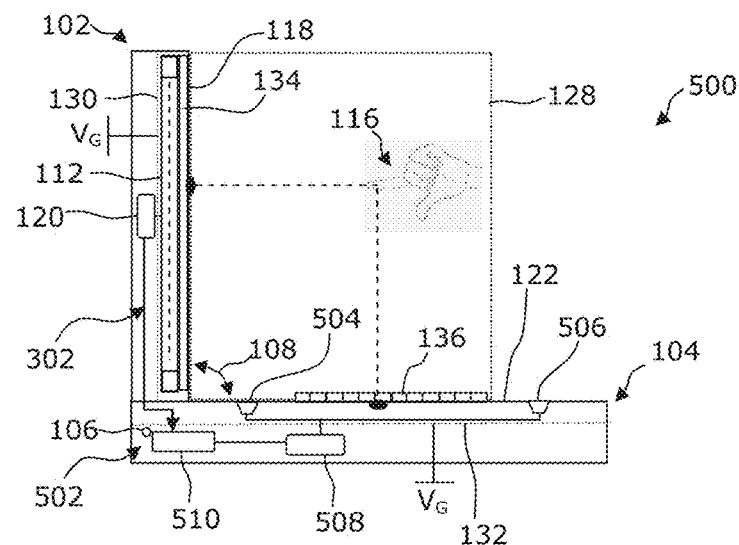
FIG. 5 is a diagrammatic side view of a fourth example of an appliance according to the invention implementing a device according to the invention.

FIG. 5 is a schematic diagram of a fourth example of an appliance according to the invention.

The appliance 500 shown in FIG. 4 corresponds to the appliance 100 in FIG. 1, with the difference that the second detection means comprises one or more non-capacitive detection sensors 504 and 506 and not the array of capacitive sensors 114.

Thus, the appliance 500 comprises a detection device 502 which comprises all the elements of the device 110 of the appliance 100 shown in FIG. 1, and associated with the first part 102 of the appliance 100. In other words, the detection device 502 of the appliance 500 comprises the first array of sensors 112 associated with the first part 102 of the appliance 300, linked to the first detection module 120, and guarded by the first guard means 130 set at the alternating guard potential $V_G$.

The second part 104 comprises the second guard means 132, also set at the guard potential, and extending over the entire surface of the second part 104 of the appliance 300.

The second part 104 of the appliance 500 also comprises non-capacitive sensors 504 and 506 cooperating with a second detection module 508. The second detection module 508 and the first detection module 120 are linked to a calculation means 510, similar to the calculation module 126 of the device 110 described with reference to FIG. 1.

The non-capacitive sensors 504 and 506 can be at least one of the following means:
an array of optical pixels,
an array of infrared diodes,
an array of optical light sensors,
at least one optical emitter associated with at least one optical receiver,
at least one ultrasound emitter associated with at least one ultrasound receiver operating by triangulation or trilateration,
at least two cameras arranged in order to carry out a measurement by stereoscopy, and
at least one time-of-flight camera.

Figure 6:
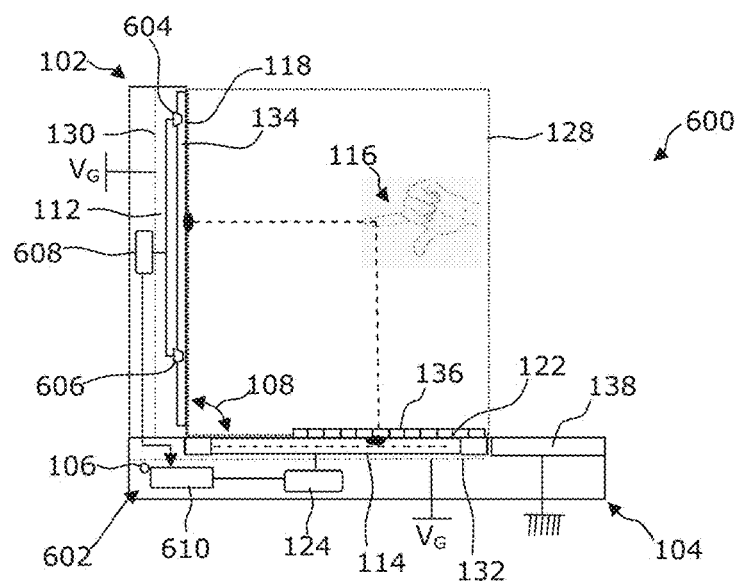
FIG. 6 is a diagrammatic side view of a fifth example of an appliance according to the invention implementing a device according to the invention.

FIG. 6 is a schematic diagram of a fifth example of an appliance according to the invention.

The appliance 600 shown in FIG. 6 corresponds to the appliance 100 in FIG. 1, with the difference that the first detection means comprises one or more non-capacitive detection sensors 604 and 606 and not the array of capacitive sensors 112.

In other words, the detection device 602 of the appliance 600 comprises the second array of sensors 114 associated with the second part 104 of the appliance 600, linked to the second detection module 124, and guarded by the second guard means 132 set at the alternating guard potential $V_G$. The appliance 600 also comprises the earthed (grounded) zone 138.

The first part 102 comprises the first guard means 130, also arranged at the guard potential, and extending over the entire surface of the first part 102 of the appliance 600.

The first part 102 of the appliance 600 also comprises non-capacitive sensors 604 and 606 cooperating with a first detection module 608. The first detection module 608 and the second detection module 124 are linked to a calculation means 610, similar to the calculation module 126 of the device 110 described with reference to FIG. 1.

The non-capacitive sensors 604 and 606 can be at least one of the following means:
an array of optical pixels,
an array of infrared diodes,
an array of optical light sensors,
at least one optical emitter associated with at least one optical receiver,
at least one ultrasound emitter associated with at least one ultrasound receiver operating by triangulation or trilateration,
at least two cameras arranged in order to carry out a measurement by stereoscopy, and
at least one time-of-flight camera.

In all the examples described, each of the first and second detection means is arranged in order to carry out detection of at least one, in particular several, command object(s) by contact of the at least one command object with the control surface associated with each detection means.

In all the examples described, the first part 102 and the second part are shown connected to each other. Of course, it is possible for the first part 102 and the second part 104 to be disconnected. In this case the signals exchanged between these two parts 102 and 104, namely the detection data and the synchronization signals in particular for the alternating guard potential $V_G$, are exchanged wirelessly between the two parts 102 and 104, these parts also comprising means of wireless exchange of data/signals, for example by Bluetooth or WIFI.

In addition, the first part 102 and the second part 104 described in the figures can be reversed.

In addition, in the examples described, each part 102 and 104 of the appliance is rectangular. Of course each part 102, 104 can have another shape, for example a shape that is circular, oval, etc.

Moreover, it is possible to use a single detection and calculation module replacing the detection and calculation modules and managing the assembly of control surfaces.

Moreover, in all the examples described, the input means 136 can be replaced by a touch screen, in particular a touch screen comprising a keyboard named "touchless", i.e. a touch screen with/without contact.

Of course, the invention is not limited to the examples which have just been described and numerous adjustments can be made to these examples without exceeding the scope of the invention.

The invention claimed is:

1. A device for interacting without contact, via at least one command object, with an electronic user appliance having at least one first and one second part which, in use, form between them a non-zero angle, said device comprising:
    a first sensor array configured for detection by capacitive technology, and without contact, of said at least one command object with respect to a first control surface defined with respect to said first part of said user appliance, said first sensor array comprising several capacitive measurement electrodes, at least one of said measurement electrodes being guarded against electrical noise from the first part by at least one first guard element held at an alternating guard potential, different from a ground potential of said at least one command object, and referenced to the potential of said at least one measurement electrode; and
    at least one second guard element formed in the second part for guarding said capacitive measurement electrodes of the first part of said user appliance against electrical noise from the second part, the at least one second guard element referenced to said guard potential of the capacitive measurement electrodes;
    wherein each of the first part and the second part represent different planar sections that are adjustable to vary the non-zero angle between them; and
    wherein the at least one second guard element of the second part is configured for guarding said capacitive measurement electrodes of the first part from electrical noise from the second part through different non-zero angles between the first part and the second part by reducing interference caused by the second part in electrostatic fields created by the capacitive measurement electrodes of the first part.

2. The device according to claim 1, characterized in that it also comprises:
    a second sensor array configured for detection of said at least one command object with respect to a second control surface forming a non-zero angle with respect to the first control surface and defined with respect to the second part of the user appliance; and
    at least one calculation circuit for determining, as a function of at least one of the detections produced by the first and second sensor arrays, and an angle formed by the first and second control surfaces, an item of detection data of said at least one command object.

3. The device according to claim 2, characterized in that the second sensor array comprises several capacitive measurement electrodes.

4. The device according to claim 1, characterized in that the first sensor array comprises at least one or any combination of the following:
    an array of optical pixels,
    an array of infrared diodes,
    an array of optical light sensors,
    at least one optical emitter associated with at least one optical receiver,
    at least one ultrasound emitter associated with at least one ultrasound receiver operating by triangulation or trilateration,
    at least two cameras arranged in order to carry out a measurement by stereoscopy, and
    at least one time-of-flight camera.

5. The device according to claim 2, characterized in that at least one of the first and second parts of the user appliance is configured for being repositionable by rotation with respect to the other part such that at least one of the control surfaces can be repositioned with respect to the other control surface.

6. The device according to claim 1, characterized in that the first sensor array is arranged in order to detect at least one of:
    a two-dimensional position of the command object in the first control surface; and
    a vertical distance between the command object and the first control surface.

7. The device according to claim 1, characterized in that the first sensor array is incorporated in the first control surface, said first control surface being a surface of the first part of the user appliance.

8. The device according to claim 1, characterized in that:
    the first sensor array comprises a first array of capacitive electrodes arranged in the first control surface formed in the first part of the user appliance arranged on a side facing the second part of said the user appliance, and
    the device further includes a second sensor array comprising a second array of capacitive electrodes arranged in a second control surface formed in the second part of the user appliance arranged on a side facing the first part of said the user appliance.

9. The device according to claim 8, characterized in that at least one of the first control surface and the second control surface is a touch surface.

10. An electronic-user appliance comprising: at least one first and one second part which, in use, form between them a non-zero angle, equipped with the device according to claim 1 for interacting with said user appliance.

11. The appliance according to claim 10, characterized in that at least one of the first and second part comprises a display screen, and the first sensor array is incorporated with said display screen such that the first control surface is formed by at least one of a part of said display screen and a plane parallel to said display screen.

12. The appliance according to claim 10, characterized in that at least one of the first and second part comprises an input surface comprising at least one data input device, and wherein the first sensor array is incorporated with said input surface such that the first control surface is formed by at least one of a part of said input surface and a plane parallel to said input surface.

13. The appliance according to claim 12, characterized in that the first control surface is formed by only a part of the input surface, said input surface comprising at least one zone provided for resting thereon at least one hand of a user while inputting, said zone being maintained at ground potential.

14. The appliance according to claim 12, characterized in that it comprises an input display screen and a face comprising an input device:
    the first sensor array being arranged in the display screen, the first control surface being constituted by at least a part of said display screen; and
    the device further includes a second sensor array comprising a second array of capacitive electrodes arranged in the input surface, the second control surface being constituted by only a part of said input surface.

15. The appliance according to claim 10, characterized in that the first part and the second part are detachable with respect to each other in such a way that they can be attached and detached manually at will.

16. The appliance according to claim 10, characterized in that the first part and the second part comprise wired or wireless communication circuits for the exchange of signals.

17. A method for contactless interaction with an electronic user appliance having at least one first and one second part capable of forming a non-zero angle between them, the method comprising:
    detecting a proximity of at least one command object with respect to the first part of the electronic user appliance using a first capacitive sensor array including a plurality of capacitive measurement electrodes formed in the first part;
    guarding at least one of the plurality of capacitive measurement electrodes against electrical noise using at least one first guard element formed in the first part, the at least one first guard element held at an alternating guard potential, different from a ground potential of the at least one command object, and referenced to the potential of the at least one capacitive measurement electrode; and
    guarding at least one of the plurality of capacitive measurement electrodes against electrical noise using at least one second guard element formed in the second part, the at least one second guard element held at the alternating guard potential referenced to the potential of the at least one capacitive measurement electrode;
    wherein each of the first part and the second part represent different planar sections, and the method further comprises
        adjusting the first part and the second part to vary the non-zero angle between them, and
        guarding said capacitive measurement electrodes of the first part using the at least one second guard element of the second part through different non-zero angles between the first part and the second part by reducing interference caused by the second part in electrostatic fields created by the capacitive measurement electrodes of the first part.

18. The method according to claim 17, further comprising:
    detecting a proximity of the at least one command object with respect to the second part of the electronic user appliance using a second capacitive sensor array including a plurality of capacitive measurement electrodes formed in the second part; and
    determining, as a function of at least one of the detections produced by the first and second sensor arrays, and an angle formed by the first and second parts, an item of detection data of the at least one command object.

19. The method according to claim 17, further comprising detecting at least one of:
    a two-dimensional position of the at least one command object with respect to the first part; and
    a vertical distance between the at least one command object and the first part.

* * * * *